United States Patent
Yang et al.

(10) Patent No.: US 7,598,906 B2
(45) Date of Patent: Oct. 6, 2009

(54) GPS WITH MASK ROM, CONTROL IC OF THE GPS AND METHOD FOR IMPLEMENTING THE SAME

(75) Inventors: Steve Wiyi Yang, Hsinchu Hsien (TW); Yu-Tai Chang, Hsinchu (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 322 days.

(21) Appl. No.: 11/601,667

(22) Filed: Nov. 20, 2006

(65) Prior Publication Data
US 2008/0024362 A1 Jan. 31, 2008

(30) Foreign Application Priority Data
Jul. 25, 2006 (CN) .................. 95 1 27064

(51) Int. Cl.
*G01S 1/02* (2006.01)
*G01S 5/14* (2006.01)

(52) U.S. Cl. ............... 342/357.06; 342/357.13; 701/213

(58) Field of Classification Search ............ 342/357.02, 342/357.06, 357.12, 357.13; 701/207, 213, 701/215, 208
See application file for complete search history.

(56) References Cited

U.S. PATENT DOCUMENTS

| | | | | |
|---|---|---|---|---|
| 5,544,087 A | * | 8/1996 | Nakajima et al. | 701/200 |
| 5,761,456 A | * | 6/1998 | Titus et al. | 710/305 |
| 2007/0106430 A1 | * | 5/2007 | Goto et al. | 701/1 |
| 2007/0288748 A1 | * | 12/2007 | Kakiuchi et al. | 713/159 |

* cited by examiner

*Primary Examiner*—Dao L Phan
(74) *Attorney, Agent, or Firm*—Birch, Stewart, Kolasch & Birch, LLP

(57) ABSTRACT

The present invention provides a global positioning system (GPS) and a method for implementing the system. The GPS includes a control unit, a GPS RF processing circuit and a storage unit. The control unit includes a microprocessor and a mask ROM storing reference information. The GPS RF processing circuit is coupled to the control unit for receiving an RF signal, transforming the RF signal into a base-band or an intermediate frequency signal and transmitting the base-band or the intermediate frequency signal to the control unit. The storage unit is coupled to the control unit to temporally store a program code. The microprocessor executes the program code and refers to the reference information to achieve global positioning.

17 Claims, 5 Drawing Sheets

US 7,598,906 B2

GPS WITH MASK ROM, CONTROL IC OF THE GPS AND METHOD FOR IMPLEMENTING THE SAME

CROSS REFERENCE TO RELATED APPLICATIONS

This application claims the benefit of Taiwan application Serial No. 95127064, filed Jul. 25, 2006, the subject matter of which is incorporated herein by reference.

BACKGROUND OF THE INVENTION

1. Field of the Invention

The present invention generally relates to a global positioning system (GPS) and a method for implementing the same and, more particularly, to a GPS with a mask read-only memory (ROM) and a method for implementing the GPS. The present invention also relates to a control integrated circuit (IC) of the GPS with the mask ROM and a method for manufacturing the control IC.

2. Description of the Prior Art

The GPS has been widely used in various applications such as the car navigation system. Please refer to FIG. 1, which is a block diagram of a conventional GPS. The GPS 100 comprises a microprocessor 110, a GPS radio-frequency (RF) processing circuit 120, an audio signal processing unit 130, a flash memory 140, a synchronous dynamic random access memory (SDRAM) 150, an I/O interface 160 and a display module 170. The GPS RF processing circuit 120 receives an RF signal from a satellite via an antenna 125, transforms the RF signal into a base-band signal and then transmits the base-band signal to the microprocessor 110. Typically, the flash memory 140 is a NAND-type flash memory for storing a program code and map data. Before the program code is executed, the program code is stored in the SDRAM 150 that has a higher accessing speed. The microprocessor 110 executes the program code temporally stored in the SDRAM 150, processes the base-band signal from the GPS RF processing circuit 120 and refers to the map data stored in the flash memory 140 so as to achieve positioning. The positioning information generated by the microprocessor 110 is broadcasted by a speaker 135 after being decoded and amplified by the audio signal processing unit 130 or displayed on the display module 170. Moreover, the positioning information can also be transmitted to other electronic appliances such as a computer by way of the I/O interface 160 coupled to the microprocessor 110. Typical I/O interface specifications include the universal serial bus (USB), and the universal asynchronous receiver transmitter (UART).

Generally, the map data occupies a large memory space and thus the GPS 100 requires a large-capacity flash memory 140, which leads to an increase in cost.

SUMMARY OF THE INVENTION

It is a primary object of the present invention to provide a global positioning system (GPS) with a mask read-only memory (ROM) and a method for implementing the GPS wherein the massive map data is stored in the mask ROM so as to reduce the cost.

In order to achieve the foregoing object, the present invention provides a GPS, including a control unit, a GPS radio-frequency (RF) processing circuit and a storage unit. The control unit includes a microprocessor and a mask ROM which stores reference information. The GPS RF processing circuit is coupled to the control unit for receiving an RF signal, transforming the RF signal into a base-band or an intermediate frequency signal and transmitting the base-band or the intermediate frequency signal to the control unit. The storage unit is coupled to the control unit to temporally store a program code. The microprocessor executes the program code and refers to the reference information to achieve global positioning.

The present invention further provides a control integrated circuit (IC) of a GPS. The control IC includes a microprocessor and a mask ROM which stores reference information. The microprocessor operates and refers to the reference information to achieve global positioning.

The present invention further provides a method for manufacturing a control IC of a GPS. The method includes steps of: manufacturing a microprocessor and a mask ROM of the control IC on a semiconductor substrate; and designing at least a data mask for defining the data content in the mask ROM. The microprocessor operates and accesses the data content in the mask ROM to achieve global positioning.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
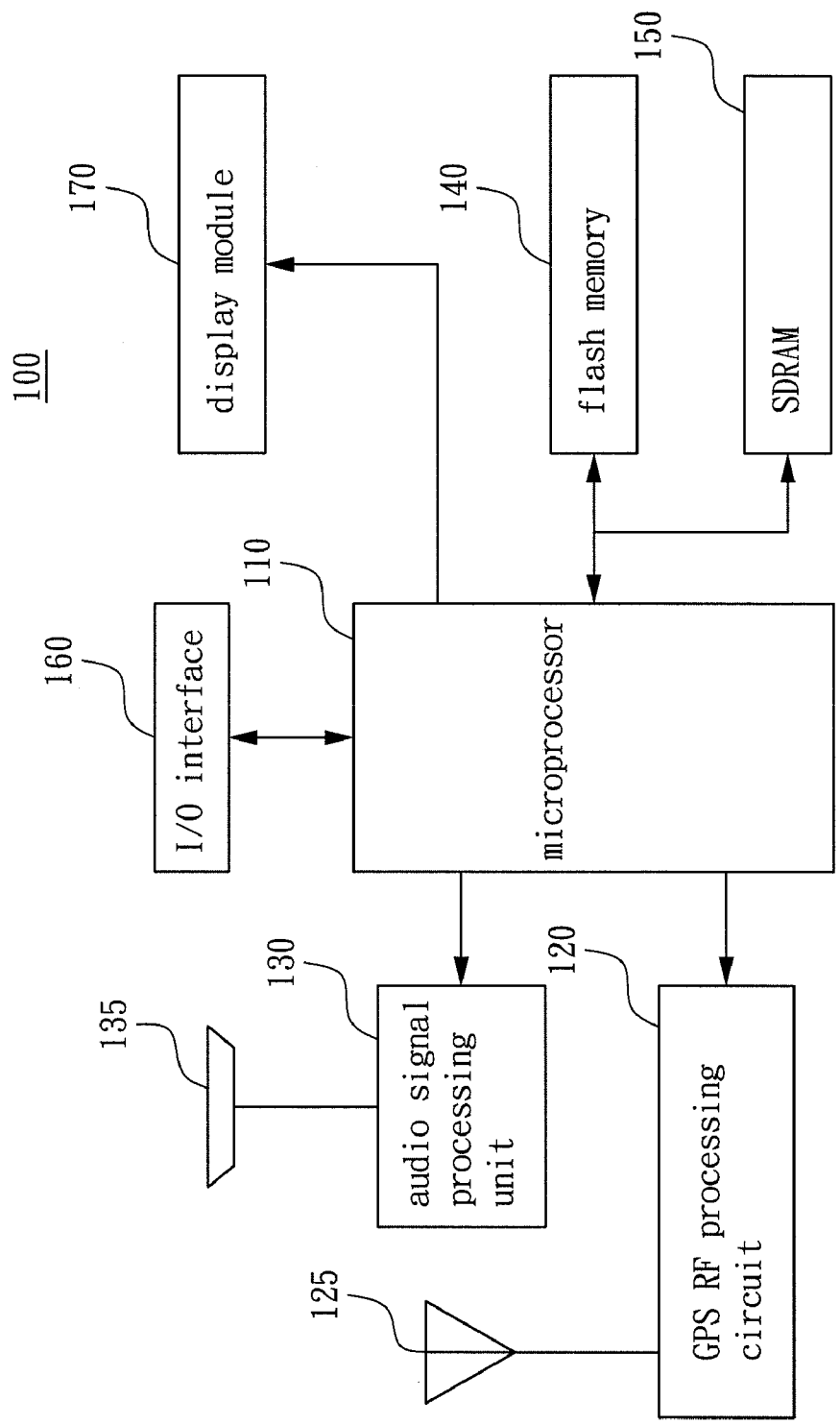
FIG. 1 is a block diagram of a conventional GPS.
Figure 2:
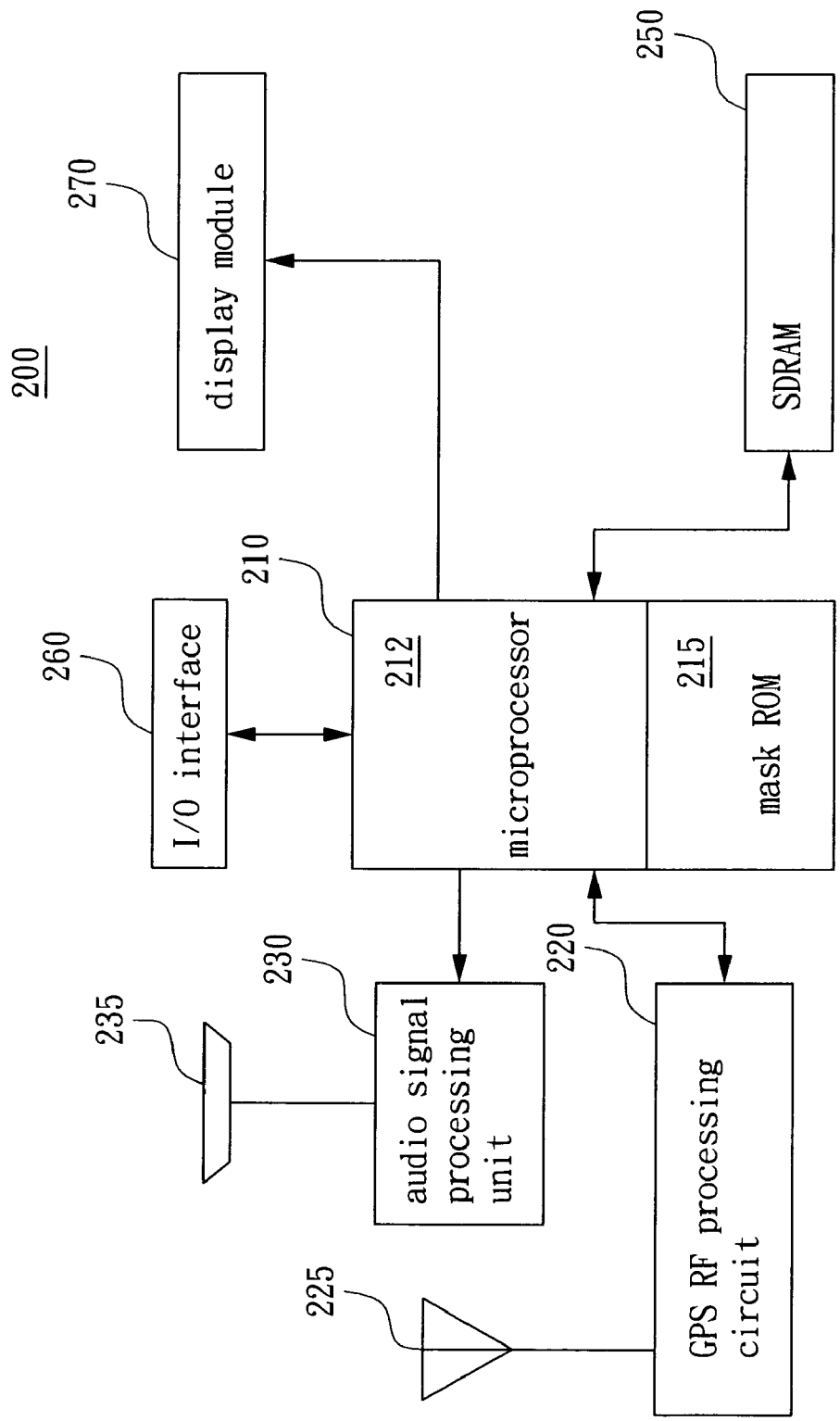
FIG. 2 is a block diagram of a GPS according to a first embodiment of the present invention.

Please refer to FIG. 2, which is a block diagram of a GPS according to a first embodiment of the present invention. The GPS 200 comprises a control unit 210, a GPS radio-frequency (RF) processing circuit 220, an audio signal processing unit 230, a synchronous dynamic random access memory (SDRAM) 250, an I/O interface 260 and a display module 270. The GPS RF processing circuit 220 receives an RF signal from a satellite via an antenna 225, transforms the RF signal into a base-band or an intermediate frequency signal and then transmits the base-band or the intermediate frequency signal to the control unit 210. In the present embodiment, the control unit (or referred to as a control IC) 210 integrates a microprocessor 212 and a mask ROM 215. The microprocessor 210 is made on a semiconductor substrate through a standard semiconductor manufacturing process. With at least a data mask, the mask ROM 215 is manufactured on the same semiconductor substrate. In other words, the microprocessor 212 and the mask ROM 215 are simultaneously manufactured on one semiconductor chip. The data stored in the mask ROM 215 can be changed by changing the pattern of the data mask. Therefore, when it comes to changing the data stored in the mask ROM 215, it is only required to modify or re-design the data mask. In the present embodiment, the mask ROM 215 stores a map data and a program code that are conventionally stored in the flash memory 140 of a conventional GPS 100. That is, the data mask is designed based on the map data and the program code, and thus the mask ROM 215 which is manufactured according to the data mask stores the map data and the program code. When the GPS operates, the microprocessor 212 reads the program code from the mask ROM 215 and temporally stores the program code in the SDRAM 250 before the program code is executed. The microprocessor 212 processes the base-band or the intermediate frequency signal from the GPS RF processing circuit 220 and refers to the map data stored in the mask ROM 215 so as to achieve positioning. The positioning information is broadcasted by a speaker 235 after being decoded and amplified by the audio signal processing unit 230 or displayed on the display module 270. Moreover, the positioning information can also be transmitted to other electronic appliances such as a computer, a PDA and so on by way of the I/O interface 260 coupled to the control unit 210. Typical I/O interface specifications include the universal serial bus (USB), the universal asynchronous receiver transmitter (UART), Bluetooth and etc.

In the present embodiment, the program code and the massive map data are both stored in the mask ROM 215 rather than a flash memory. Compared to a flash memory, the mask ROM 215 is advantageous due to its low manufacturing cost. In addition, only one or more than one data mask has to be changed when the content stored in the mask ROM 215 is required to be updated. Therefore, the cost for the GPS with the mask ROM is significantly reduced.

Figure 3:
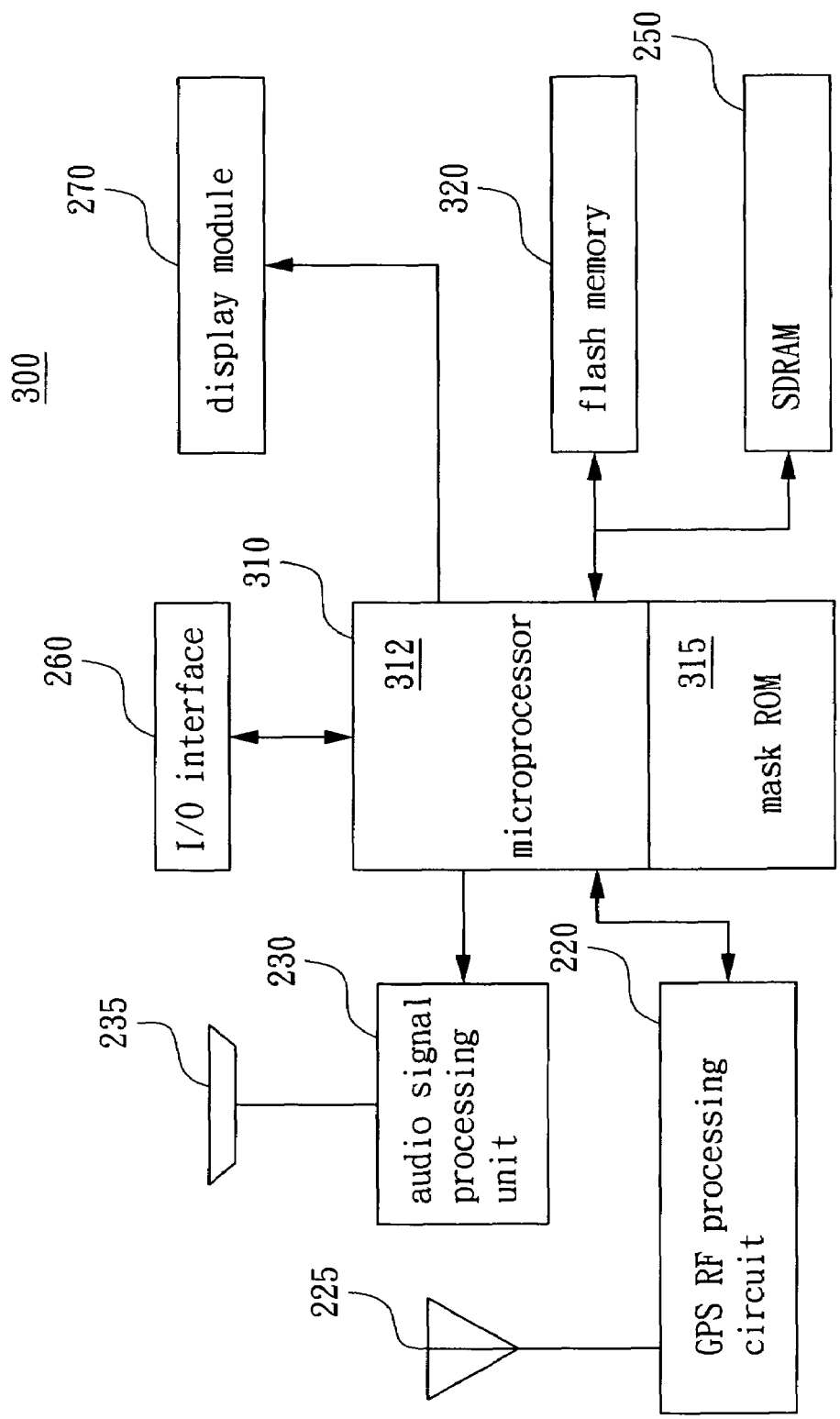
FIG. 3 is a block diagram of a GPS according to a second embodiment of the present invention.

Please refer to FIG. 3, which is a block diagram of a GPS according to a second embodiment of the present invention. The GPS 300 comprises a control unit 310, a GPS radio-frequency (RF) processing circuit 220, an audio signal processing unit 230, a synchronous dynamic random access memory (SDRAM) 250, an I/O interface 260, a display module 270 and a flash memory 320. It is noted that elements shown in the present embodiment possess the same function as those designated by the same number in the previous embodiment, and therefore the description thereof is omitted. Similarly, the control unit (or referred to as a control IC) 310 integrates a microprocessor 312 and a mask ROM 315. The method for manufacturing the control unit 310 is similar to the method for manufacturing the control unit 210 and the description thereof is omitted. What is different is that, in the present embodiment, the mask ROM 315 is used for storing the map data, while the program code is stored in the flash memory 320. In other words, the data mask for manufacturing the mask ROM 315 is designed according to the map data and, thus, the mask ROM 315 manufactured according to the data mask stores the map data. When the GPS operates, the microprocessor 312 temporally stores the program code in the SDRAM 250 before the program code is executed. The microprocessor 312 processes the base-band or the intermediate frequency signal from the GPS RF processing circuit 220 and refers to the map data stored in the mask ROM 315 so as to achieve positioning. In one preferred embodiment, the flash memory 320 is a NOR-type flash memory. Since the NOR-type flash memory has advantages such as a high speed, it is proper to use the NOR-type flash memory for storing the program code and the update process of the program code would be simplified in the GPS 300. Compared to map data, the program code requires a relatively small memory capacity and, thus, the flash memory does not require a large memory capacity. In this case, the massive map data is still stored in the mask ROM 315. Compared to the conventional GPS 100, the GPS 300 in the present embodiment is advantageous due to its lower cost. Similarly, in the present embodiment, only one or more than one data mask has to be changed when the map data is required to be updated. As for updating the program code, only the content in the flash memory 320 has to be updated. Since the speed for accessing the program code is accelerated, the overall performance of the GPS is enhanced.

Figure 4:
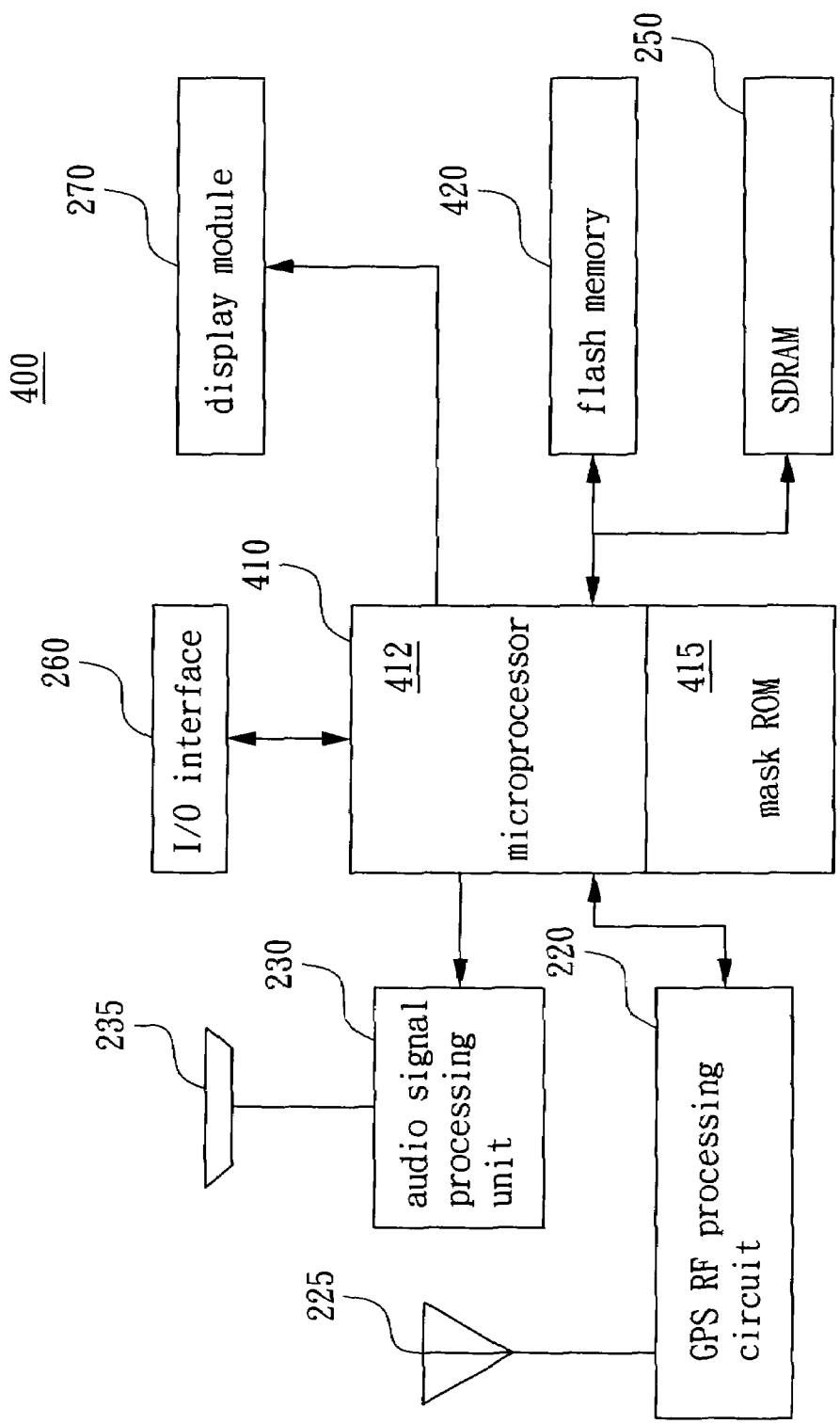
FIG. 4 is a block diagram of a GPS according to a third embodiment of the present invention.

Please refer to FIG. 4, which is a block diagram of a GPS according to a third embodiment of the present invention. The GPS 400 comprises a control unit 410, a GPS radio-frequency (RF) processing circuit 220, an audio signal processing unit 230, a synchronous dynamic random access memory (SDRAM) 250, an I/O interface 260, a display module 270 and a flash memory 420. It is noted that elements shown in the present embodiment possess the same function as those designated by the same number in the previous embodiment, and therefore the description thereof is omitted. Similarly, the control unit (or referred to as a control IC) 410 integrates a microprocessor 412 and a mask ROM 415. The method for manufacturing the control unit 410 is similar to the method for manufacturing the control unit 210 and the description thereof is omitted. Similarly, in the present embodiment, the mask ROM 415 is used for storing the map data and the program code. In other words, the data mask for manufacturing the mask ROM 415 is designed according to the map data and the program code and, thus, the mask ROM 415 manufactured according to the data mask stores the map data and the program code. When the GPS operates, the microprocessor 412 temporally stores the program code in the SDRAM 250 before the program code is executed. The flash memory 420 stores modified information of the map data. Before the microprocessor 412 accesses the map data, it searches for the modified information of the map data stored in the flash memory 420. The microprocessor 412 accesses unmodified map data from the mask ROM 415 if no required modified information is found. In one preferred embodiment, the flash memory 420 is a NAND-type flash memory. Similarly, in the present embodiment, only one or more than one data mask has to be changed when the map data is required to be updated. The GPS 400 is advantageous in that the modified information of the map data can be stored in an additional flash memory 420 if the modified information does not require a large memory capacity. Therefore, there is no need to update the mask when the map data is only partially updated. Please note the flash memory 420 can be built in the GPS 400 or externally connected to the GPS 400, which provides more flexibility in partially updating the map data.

Figure 5:
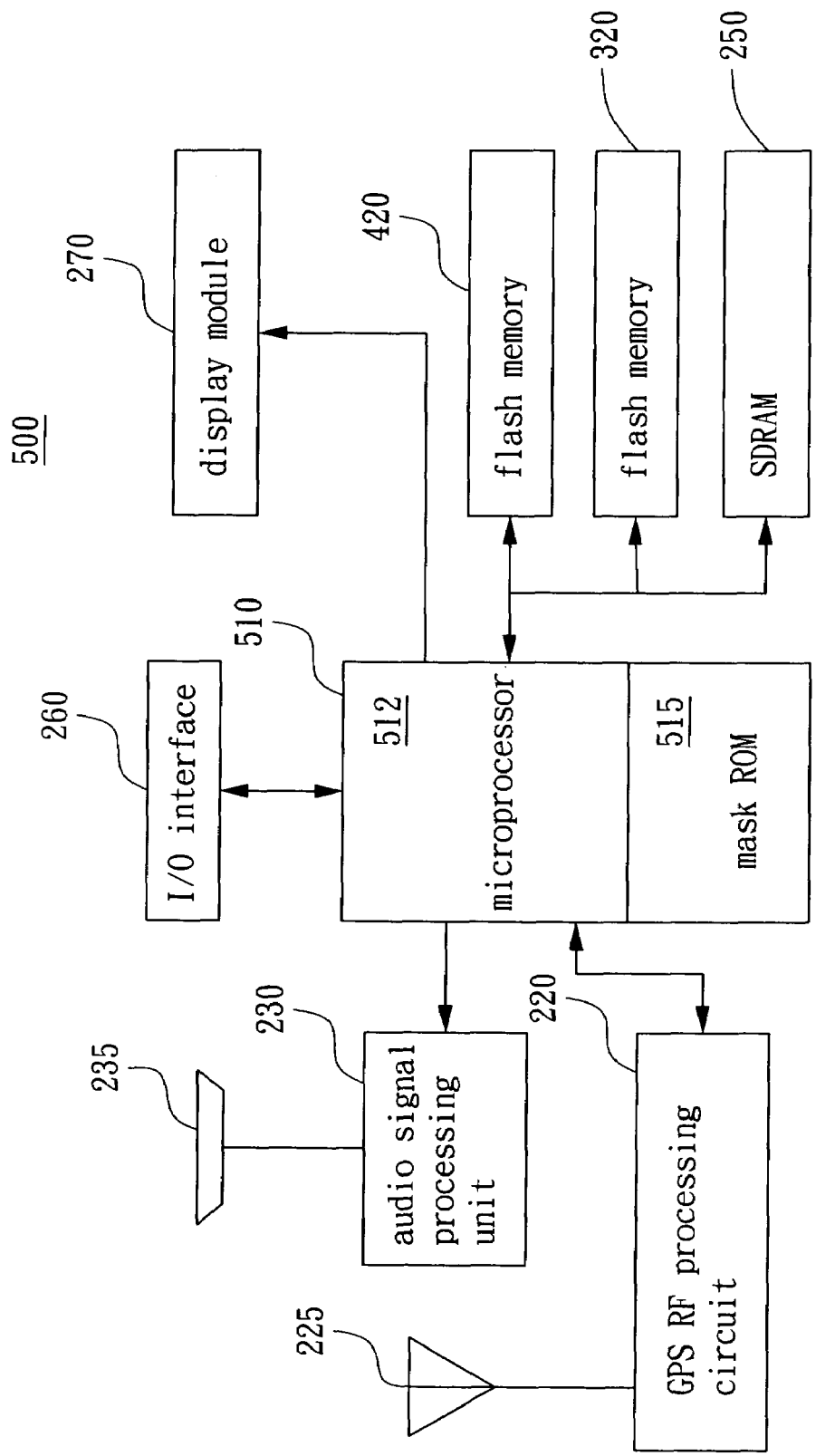
FIG. 5 is a block diagram of a GPS according to a fourth embodiment of the present invention.

Please further refer to FIG. 5, which is a block diagram of a GPS according to a fourth embodiment of the present invention. The GPS 500 comprises a control unit 510, a GPS radio-frequency (RF) processing circuit 220, an audio signal processing unit 230, a synchronous dynamic random access memory (SDRAM) 250, an I/O interface 260, a display module 270, a flash memory 320 and a flash memory 420. The present embodiment is a combination of the previous two embodiments. It is noted that elements shown in the present embodiment possess the same function as those designated by the same number in the previous embodiment, and therefore the description thereof is omitted. Similarly, the control unit (or referred to as a control IC) 510 integrates a microprocessor 512 and a mask ROM 515. The method for manufacturing the control unit 510 is similar to the method for manufacturing the control unit 210 and the description thereof is omitted. In the present embodiment, the mask ROM 515 is used for storing the map data, while the program code is stored in the flash memory 320. In other words, the data mask for manufacturing the mask ROM 515 is designed according to the map data and, thus, the mask ROM 515 manufactured according to the data mask stores the map data. When the GPS operates, the microprocessor 512 temporally stores the program code in the SDRAM 250 before the program code is executed. The flash memory 420 stores modified information of the map data. Before the microprocessor 512 accesses the map data, it searches for the modified information of the map data stored in the flash memory 420. The microprocessor 512 accesses unmodified map data from the mask ROM 515 if no required modified information is found. In one preferred embodiment, the flash memory 320 is a NOR-type flash memory and the flash memory 420 is a NAND-type flash memory. Similarly, in the present embodiment, the flash memory 420 can be built in the GPS 500 or externally connected to the GPS 500. Please note that the programs code and the modified information of the map data can be stored in the same flash memory, for example, the flash memory 320 or the flash memory 420. In this case, the GPS 500 requires only one flash memory.

In the present invention, a mask ROM is integrated on a control chip of the GPS such that the massive map data can be stored in a relatively low-cost mask ROM and the program code can be stored in the same mask ROM or other storage unit. It is easy to change the content in the mask ROM by modifying or re-designing the pattern of the mask when the map data has to be updated. If the map data is only partially updated, the modified information of the map data can be stored in a build-in flash memory or an externally connected flash memory, which provides more flexibility in partially updating the map data.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A global positioning system (GPS), comprising:
   a control unit comprising a microprocessor and a mask read-only memory (ROM) storing a map data;
   a GPS radio-frequency (RF) processing circuit coupled to the control unit for receiving an RF signal, transforming the RF signal into a base-band or an intermediate frequency signal and transmitting the base-band or the intermediate frequency signal to the control unit; and
   a first storage unit coupled to the control unit for temporally storing a program code;
   wherein the microprocessor executes the program code and refers to the map data to achieve global positioning.

2. The GPS of claim 1, wherein the mask ROM stores the program code and the microprocessor temporally stores the program code in the first storage unit before the microprocessor executes the program code.

3. The GPS of claim 2, further comprising:
   a second storage unit coupled to the control unit for storing modified information;
   wherein the microprocessor executes the program code and refers to the map data and the modified information to achieve global positioning.

4. The GPS of claim 3, wherein the second storage unit is a flash memory.

5. The GPS of claim 1, further comprising:
   a second storage unit coupled to the control unit for storing the program code;
   wherein the microprocessor temporally stores the program code in the first storage unit before the microprocessor executes the program code.

6. The GPS of claim 5, wherein the second storage unit is a flash memory.

7. The GPS of claim 5, wherein the second storage unit further stores modified information and the microprocessor executes the program code and refers to the map data and the modified information to achieve global positioning.

8. The GPS of claim 5, further comprising:
   a third storage unit coupled to the control unit for storing modified information;
   wherein the microprocessor executes the program code and refers to the map data and the modified information to achieve global positioning.

9. The GPS of claim 8, wherein the third storage unit is a flash memory.

10. The GPS of claim 1, wherein the first storage unit is a synchronous dynamic random access memory (SDRAM).

11. A control integrated circuit (IC) of a global positioning system (GPS), the control IC comprising a microprocessor and a mask read-only memory (ROM) storing a map data, wherein the microprocessor operates and refers to the map data to achieve global positioning.

12. The control IC of claim 11, wherein the mask ROM stores a program code and the microprocessor executes the program code and refers to the map data to achieve global positioning.

13. The control IC of claim 11, wherein the map data is changed by changing at least a mask of the mask ROM.

14. The control IC of claim 11, wherein the mask ROM and the microprocessor are manufactured simultaneously on a semiconductor chip.

15. A method for manufacturing a control integrated circuit (IC) of a global positioning system (GPS), the method comprising steps of:
   manufacturing a microprocessor and a mask read-only memory (ROM) of the control IC on a semiconductor substrate; and
   designing at least a data mask for defining the data content in the mask ROM according to a map data;
   wherein the microprocessor operates and accesses the data content in the mask ROM to achieve global positioning.

16. The method of claim 15, further comprising a step of:
   changing the data mask so as to change the data content in the mask ROM.

17. The method of claim 15, wherein the step of designing the data mask comprising a step of:
   designing the data mask further according to a program code;
   wherein, the manufactured mask ROM stores the map data and the program code and the microprocessor executes the program code and accesses the map data to achieve global positioning.

* * * * *